Feb. 5, 1957 W. B. LEE 2,780,163
PIE MOLD
Filed May 7, 1954
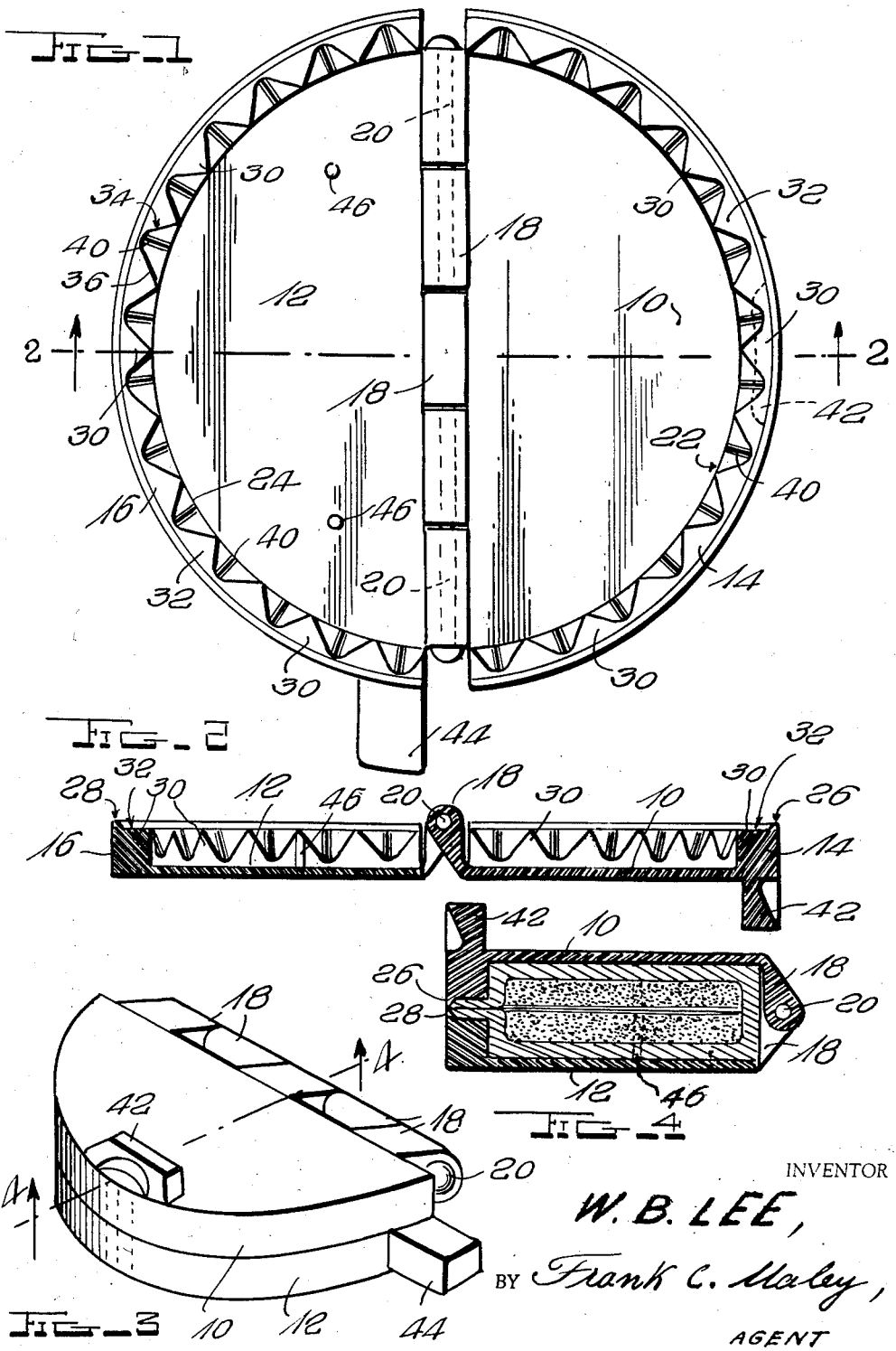
INVENTOR
W. B. LEE,
BY Frank C. Maley,
AGENT

United States Patent Office 2,780,163
Patented Feb. 5, 1957

2,780,163

PIE MOLD

Wesley B. Lee, Asheville, N. C., assignor of fifty percent to Billy C. Spivey and fifty percent to Lawrence Spivey, Jr., Fairview, N. C.

Application May 7, 1954, Serial No. 428,213

1 Claim. (Cl. 99—375)

This invention appertains to improvements in pie making apparatus and particularly is directed to a molding device for use in making fried pies.

The primary object of this invention is to provide a sectional mold, which includes a pair of complemental hingedly connected sections which are adapted to lie side by side in coplanar relation to receive a thin sheet of pie dough and a suitable filling and which are adapted to be swung together into superposed relation and thereby close the sheet around the filling and in so doing cut off the excess dough and trim the edges, while also tightly sealing the edges together.

Another important object of this invention is to provide means carried by the bottom section only for providing air and steam relief ports in the dough as the pie is being molded.

Another object of this invention is to provide cooperating cutting means on the free edges of the sections, which cutting means operate, as the sections are brought together, to automatically trim the edges of the pie, remove the excess dough and aid in sealing the edges.

A still further object of this invention is to provide means arranged inwardly of such cutting means for crimping and sealing the edges of the pie.

A still further object of this invention is to provide a compact, inexpensive and easily operated pie mold by means of which perfectly formed, filled and sealed pies may quickly be made.

The foregoing and other objects are attained by this invention, the preferred embodiment of which is set forth in the following description and illustrated in the accompanying drawing, wherein:

Fig. 1 is a top plan view of the mold in an open position;

Fig. 2 is a cross-sectional view taken on line 2—2 of Fig. 1;

Fig. 3 is a perspective view of the mold in a closed position, and

Fig. 4 is a cross-sectional view taken on line 4—4 of Fig. 3.

Referring now more particularly to the drawing, the pie mold includes a top section 10 and a bottom section 12, such sections being identical in size and configuration and designed for complemental superposed relation. The top section 12 includes a semi-circular flat wall 14, which forms the top wall of the mold, and the bottom section has a semi-circular flat wall 16, which forms the bottom wall of the mold. Such walls have side by side straight side edges which are provided with integral, perpendicular hinge knuckles 18 which interfit and receive hinge pins 20.

Curved side walls 22 and 24 are formed on the curved side edges of the walls 14 and 16 and disposed perpendicular to the inner surfaces thereof, so that the side wall 22 depends from the curved edge of the wall 14 and the side wall 24 upstands from the curved edge of the wall 16. The side walls 22 and 24 are complemental in curvature and size and have free edges 26 and 28 which are adapted to contact and which are pointed to constitute cutting edges.

Inwardly of such cutting edges, each of the walls 22 and 24 is formed with a continuous series of circumferentially spaced crimping teeth 30. Each of the teeth has an outer face 32 which is disposed inwardly of and normal to the cutting edges. The faces 32 are flat and are arranged in the same plane along a circle below and concentric to the cutting edges. Each of the teeth also has inwardly convergent side faces 34 and 36 which converge at the minor end of the inner faces 38, which are disposed perpendicular to the walls 14 and 16. Thus, the faces 38, which commonly lie in a circle that parallels and is spaced radially inward of the walls 22 and 24, are flat and are disposed at right angles to the faces 32. The teeth are spaced apart by the U-shaped valleys 40, which are disposed obliquely to the walls 14 and 16. The valleys 40 do not extend to the side wall and terminate at the connecting webs 41 between the faces 32 of the teeth, such webs 41 being coplanar with the faces 32.

The top wall 14 is provided with a handle 42 that is formed on the outer surface thereof at the center of the curved side edge and is used to lift the top section 10 of the mold off of the bottom section and expose the formed pie. The bottom section has a carrying handle 44 which radially extends from one end of the side wall 24 at the straight side edge of the bottom section and is used to invert the bottom section and thereby remove the pie therefrom.

Pins 46 are formed on the inner surfaces of the bottom wall 12 and are disposed perpendicular thereto so as to impale the sheet of dough and preform steam pressure release holes in the top of the pie.

In use, a circular sheet of pie dough is laid over the inner surfaces of the sections 10 and 12, which are disposed open in coplanar side-by-side relation, as shown in Fig. 1. The sheet will have its peripheral edge slightly overhanging the edges 26 and 28 and the desired filling, fruit, meat or the like, will be placed on the portion of the dough sheet overlying the bottom section 12. The top section 10 will then be swung upwardly and brought down onto the bottom section. Such movement will swing the top portion of the dough sheet over onto the filling and, when the edges 26 and 28 contact, the excess dough will be cut off and the edges of the pie will be trimmed. The faces 32 and webs 41 of the teeth on both sections will exert a compressing action on the meeting curved edges of the dough sheet, with the valleys receiving the material compressed by the faces 32. Thus, the edges of the pie will be compressed tightly together by the faces 32 and webs 41 and the portions adjacent the edges will be crimped, so that the edges will thus be tightly sealed.

When the sheet is laid on the open section, the portions will be impaled by the pins so as to form definite pressure release holes in the sections.

The top section is raised by the handle 42 and held open while the bottom section is inverted to deposit the formed pie on a surface, from whence it may be picked up and placed in a frying receptacle. Of course, the mold is equally well useable for any type or nature of pies.

It is preferred to mold the sections of the mold from a light-weight durable plastic, as shown in the drawing, though the sections may be formed from any other desired material. Furthermore, while the best known form of this invention has been shown in the drawing and described herein, other forms may be realized as come within the scope of the appended claim.

I claim:

A mold for molding a pie for frying comprising a pair of identical semi-circular flat imperforate sections having adjoining straight side edges formed with upstanding interfitting hinge knuckles connected by a hinge pin to form straight walls, said sections having arcuate free side walls, said side walls upstanding from the flat sections and having coplanar, upper, free edges, said flat sections having inner flat surfaces on which a circular sheet of dough is laid, the sheet of dough overlying the straight walls and being folded over onto itself about a filling when the sections are moved into superposed closed relation with the free edges of their side walls in contact, said free edges having outermost portions formed with complementary, contacting knife edges to automatically trim the edges of the pie, said free edges inwardly of the knife edges being formed with a continuous series of circumferentially spaced crimping teeth, each of said teeth having a flat outer face disposed parallel to the flat inner surfaces of the sections and arranged in a plane along a circle slightly below and concentric to the knife edges, each of said teeth having inwardly convergent side faces disposed perpendicular to the flat outer faces and separated by valleys which are disposed oblique to the side walls, a handle on the outer surface of one section adjacent the center of the outer curved edge thereof and a handle on the side wall of the other section and extending from one end thereof parallel to the straight side edge of said section and a plurality of upstanding studs secured to one of said flat sections whereby the sheet of dough is perforated and retained in contact with said last-mentioned flat section upon the dough being folded over onto itself.

References Cited in the file of this patent

UNITED STATES PATENTS

| | | |
|---|---|---|
| 1,532,881 | Capi | Apr. 7, 1925 |
| 1,596,652 | Giovannetti | Aug. 17, 1926 |
| 1,728,064 | Johnson | Sept. 10, 1929 |
| 2,029,448 | Tatosian | Feb. 4, 1936 |
| 2,346,839 | Harriss et al. | Apr. 18, 1944 |
| 2,463,439 | Strietelmeier | May 1, 1949 |
| 2,589,140 | Rosenberger | Mar. 11, 1952 |